United States Patent
Beckmann

(10) Patent No.: US 6,186,582 B1
(45) Date of Patent: Feb. 13, 2001

(54) COVERING PART, IN PARTICULAR FOR SHEET-METAL SUPPORTING PARTS IN MOTOR VEHICLES

(75) Inventor: Friedhelm Beckmann, Hiddenhausen (DE)

(73) Assignee: Moeller Plast GmbH, Bielefeld (DE)

( * ) Notice: Under 35 U.S.C. 154(b), the term of this patent shall be extended for 0 days.

(21) Appl. No.: 09/302,646

(22) Filed: Apr. 29, 1999

Related U.S. Application Data

(63) Continuation of application No. PCT/DE97/02383, filed on Oct. 17, 1997, which is a continuation-in-part of application No. 09/067,072, filed on Apr. 27, 1998, which is a continuation of application No. PCT/DE97/01240, filed on Jun. 18, 1997.

(30) Foreign Application Priority Data

Aug. 25, 1996 (DE) .................................. 196 34 246
Oct. 31, 1996 (DE) .................................. 196 44 075

(51) Int. Cl.$^7$ .................................................. B60R 21/04
(52) U.S. Cl. .............................................. 296/189; 280/751
(58) Field of Search ........................... 296/189, 202, 296/188, 203.01, 205, 203.03, 39.1; 280/751, 748; 293/136, 120

(56) References Cited

U.S. PATENT DOCUMENTS

| 4,563,374 | 1/1986 | Treber et al. . |
| 4,786,540 | 11/1988 | Bruhnke et al. . |
| 5,330,805 | 7/1994 | Shirahata . |
| 5,433,478 | * 7/1995 | Eissinger et al. ............... 293/120 |
| 5,531,499 | * 7/1996 | Vecchio et al. ............... 296/146.7 |
| 5,580,116 | * 12/1996 | Patel et al. ................... 296/39.1 |
| 5,609,385 | * 3/1997 | Daniel et al. .................. 296/188 |
| 5,658,027 | * 8/1997 | Eissinger et al. ............... 293/120 |
| 5,660,426 | * 8/1997 | Sugimori et al. ............... 296/189 |
| 5,803,532 | * 9/1998 | Karuppaswamy et al. ...... 296/189 |
| 5,836,641 | * 11/1998 | Sugamoto et al. .............. 296/189 |

FOREIGN PATENT DOCUMENTS

| 31 09 266 A1 | 2/1982 | (DE) . |
| 0 69 368 A2 | 1/1983 | (EP) . |
| 2 321 406 | 3/1977 | (FR) . |

OTHER PUBLICATIONS

Japanese Patent Abstract No. 59020630 (Takao et al.), dated Feb. 2, 1984.

* cited by examiner

*Primary Examiner*—D. Glenn Dayoan
*Assistant Examiner*—Jason Morrow
(74) *Attorney, Agent, or Firm*—Herbert L. Lerner; Laurence A. Greenberg; Werner H. Stemer

(57) ABSTRACT

A covering part, in particular for sheet-metal supporting parts in motor vehicles, includes a hollow section formed by blow molding. The hollow section has a cavity filled with foam material. The foam material is placed in the cavity in powder form, granular form, or paste form and is foamed by a thermal action. The structure according to the invention ensures that impact energy is adequately absorbed. A method for producing the covering part is also provided.

4 Claims, 4 Drawing Sheets

COVERING PART, IN PARTICULAR FOR SHEET-METAL SUPPORTING PARTS IN MOTOR VEHICLES

CROSS-REFERENCE TO RELATED APPLICATION

This application is a continuation of International Application No. PCT/DE97/02383, filed Oct. 17, 1997, which designated the United States and a continuation-in-part of application Ser. No. 09/067,072, filed Apr. 27, 1998, which is a continuation of International Application No. PCT/DE97/01240, filed Jun. 18, 1997, which designated the United States.

BACKGROUND OF THE INVENTION

Field of the Invention

The invention relates to a covering part for absorbing impact energy, in particular for sheet-metal supporting parts in motor vehicles.

Safety regulations in the motor vehicle industry require energy-absorbing materials to be disposed in those internal regions which are at risk from head impact, in order to reduce the risk of injury. In order to satisfy those requirements, airbag systems or coverings produced by injection molding are disposed in the regions at risk and the coverings are backed by a suitable foam system. The installation of the elements produced from a plurality of parts by injection molding is time consuming and transition regions between the plastic parts and the foam part are associated with optical restrictions.

SUMMARY OF THE INVENTION

It is accordingly an object of the invention to provide a covering part for impact absorption, in particular for sheet-metal supporting parts in motor vehicles, which overcomes the hereinafore-mentioned disadvantages of the heretofore-known devices of this general type and which provides a hollow structure of the covering part completely filled with foam for absorbing energy, while at the same time simplifying installation.

With the foregoing and other objects in view there is provided, in accordance with the invention, a covering part for absorbing impact energy, which includes a hollow section formed by blow molding, the hollow section defining a cavity; and a foam material filled in the cavity, the foam material placed in the cavity as a foamable material in one of a powder form, a granular form, and a paste form, and foamed by a thermal action.

In accordance with another feature of the invention, the thermal action is a direct thermal action or is an indirect thermal action performed by one of a microwave energy and a high frequency energy.

In accordance with a further feature of the invention, the covering part of the invention is provided for a sheet-metal supporting part in a motor vehicle.

With the objects of the invention in view there is also provided a method of producing a covering part for absorbing impact energy, which comprises blow molding a hollow section and forming a cavity therein; placing foamable material of one of a powder form, a granular form, and a paste form in the cavity; and expanding the foamable material by providing heat energy.

In accordance with another mode of the invention, the heat energy is provided directly or is provided indirectly as microwave energy or high frequency energy.

The object of the invention is achieved by filling a foamable material having an arbitrary consistency into the hollow profile and expanding the foamable material by providing energy. The foamable material is preferably introduced into the hollow profile in powder form, granular form, or as a material having a spreadable consistency. Energy may be provided to the foamable material directly and/or indirectly. In accordance with the invention the energy is provided as heat energy, high frequency energy, or microwave energy. Preferably a partly crystalline olefinic co-polymer is used. Other features which are considered as characteristic for the invention are set forth in the appended claims.

Although the invention is illustrated and described herein as embodied in a covering part, in particular for sheet-metal supporting parts in motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
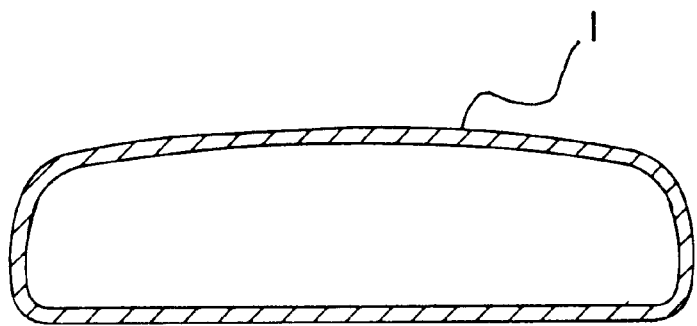
FIG. 1 is a diagrammatic, sectional view of a basic form of a hollow section.

Referring now to the figures of the drawings in detail and first, particularly, to FIG. 1 thereof, there is seen a covering part in the form of a hollow section 1 having a rear side facing downward in the drawing.

Figure 2:
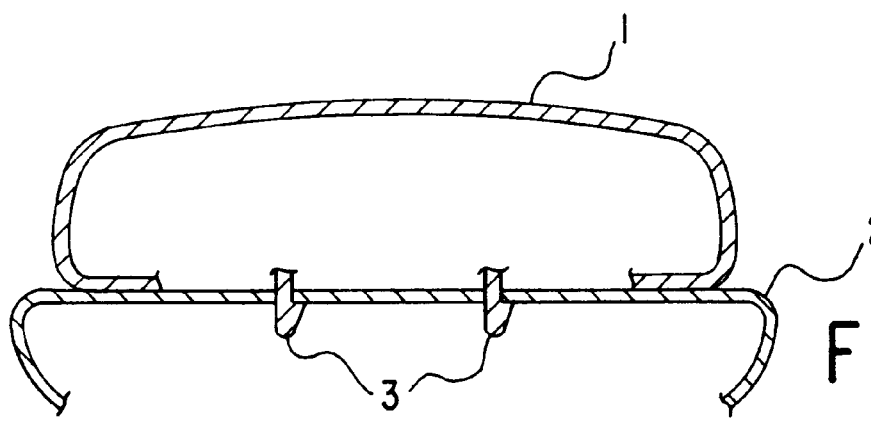
FIG. 2 is a sectional view of a hollow section which is bearing in a planar manner against a sheet-metal supporting part and is secured therein.

The hollow section 1 of FIG. 2 bears in a planar manner against a sheet-metal supporting part 2. The hollow section 1 is produced in one piece by blow molding. In order to secure the hollow section 1 on the sheet-metal supporting part 2, use is made of fastening elements 3 which are firmly integrated in the hollow section 1 and are in the form of protruding elements that can be latched into corresponding sockets on the sheet-metal supporting part 2.

Figure 15:
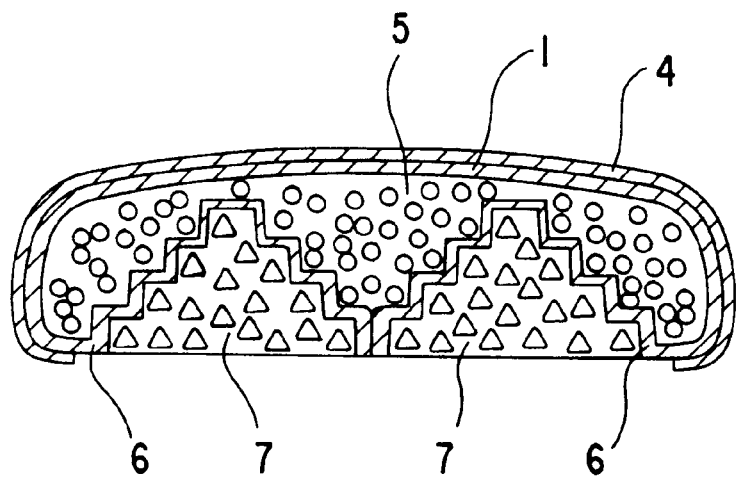
FIG. 15 is a sectional view similar to FIG. 14, but with an additional surface decoration on the outside of the hollow section.

According to FIG. 15, the outside of the hollow section 1 is provided with a surface decoration 4. This surface decoration 4 is placed into a mold and is attached to the hollow section 1 by the blow molding procedure. This connection is produced purely mechanically by pore connection.

The shape of the hollow section 1 can be selected freely with the prerequisite that the rear side bears completely or partially in a planar manner against the sheet-metal supporting part 2 in order to produce a connection. The rear side of the hollow section 1 can be profiled in a variety of ways, as is illustrated in the figures. In the structures according to FIGS. 5, 7 and 12 to 15, walls of the rear side have profilings which are in the form of steps and differ in thickness. Accordingly, a region which bears against the sheet-metal supporting part 2 has a greater thickness than a region which runs toward the outside.

Figure 3:
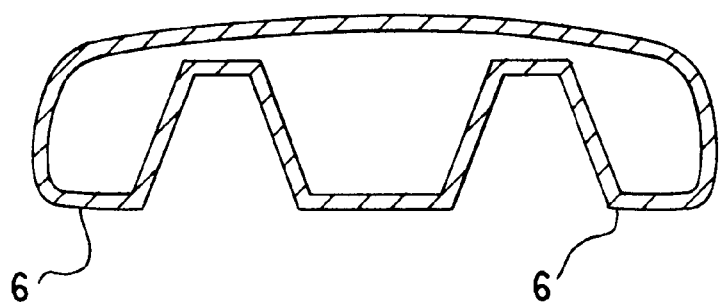
FIG. 3 is a sectional view of a hollow section with a trapezoidal profiling on a rear side.
Figure 4:
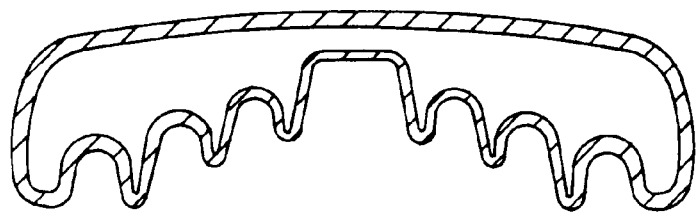
FIG. 4 is a sectional view of a hollow section with a rounded profiling in the form of steps.
Figure 5:
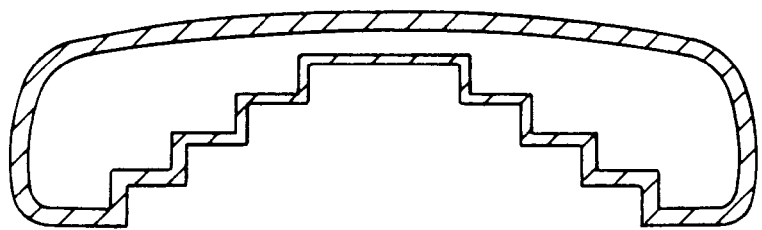
FIG. 5 is a sectional view of a hollow section with a profiling on the rear side which is in the form of steps.
Figure 6:
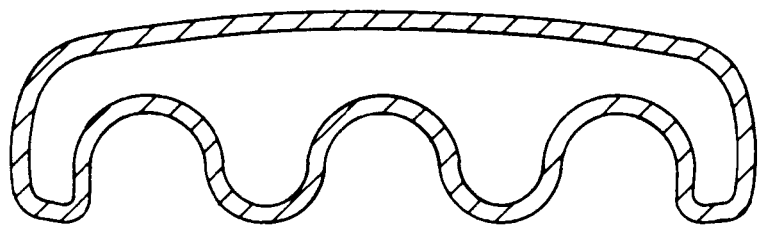
FIG. 6 is a sectional view of a hollow section with rounded profilings on the rear side.
Figure 7:
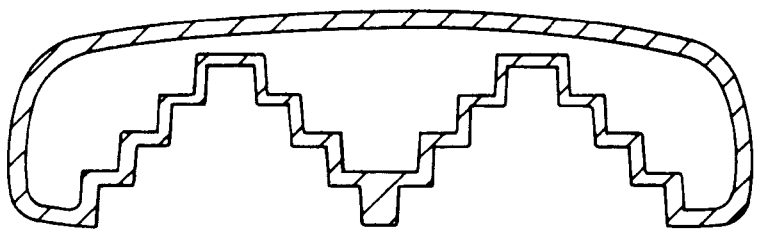
FIG. 7 is a sectional view of a variant of FIG. 5.
Figure 8:
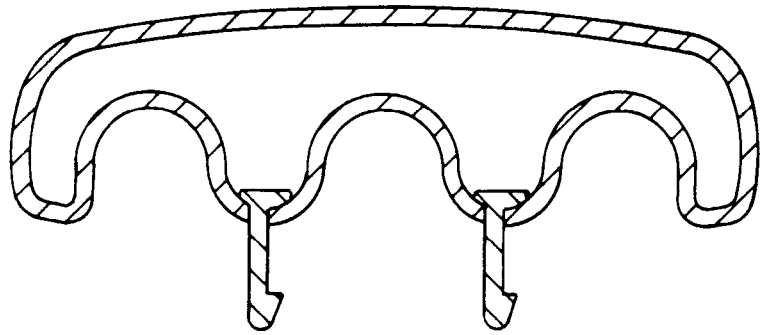
FIG. 8 is a sectional view similar to FIG. 6, but with integrated fastening elements.

The profiling according to FIG. 3 is trapezoidal and the profilings according to FIGS. 4, 6 and 8 are curved, with FIG. 4 having steps and FIG. 8 having fastening elements similar to FIG. 2.

Figure 12:
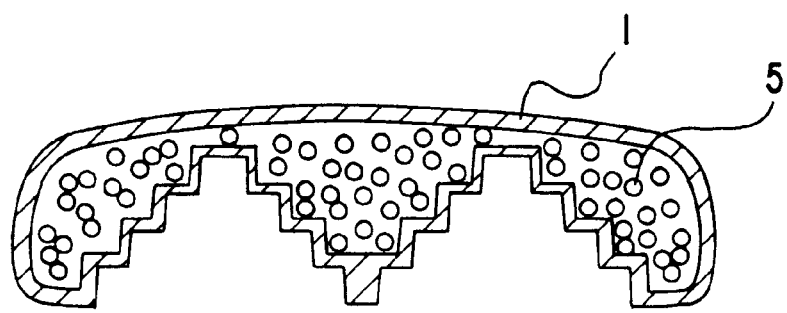
FIG. 12 is a sectional view similar to FIG. 7, but with a cavity filled with foam.
Figure 13:
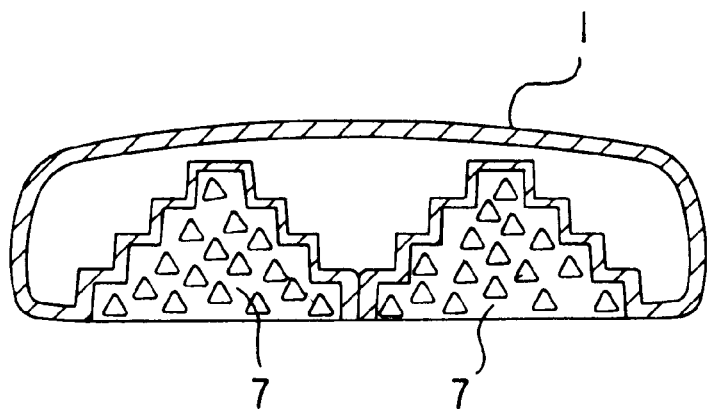
FIG. 13 is a sectional view similar to FIG. 7, but with a profiled foam part introduced into that region of the hollow section which is open to the outside.
Figure 14:
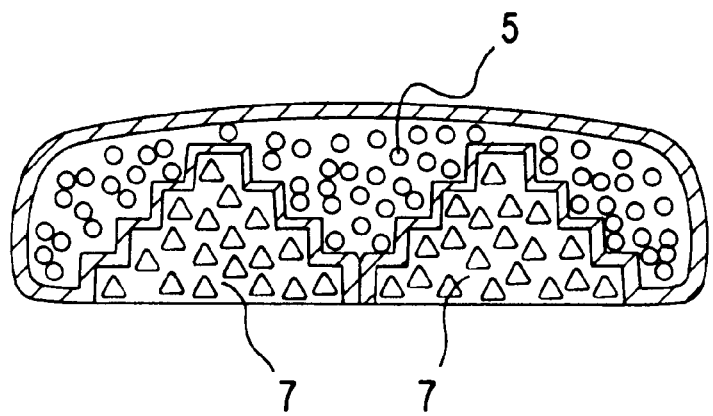
FIG. 14 is a sectional view similar to FIG. 12, but with an additional configuration of a profiled foam part in that region of the hollow section which is open to the outside.

According to FIG. 12, a cavity in the hollow section 1 is filled by foam 5. In contrast, according to FIG. 13, a profiled foam part 7 is introduced into a cavity which is present between bearing regions 6 of the rear side. According to FIG. 14, the foam 5 which is introduced by the filling procedure and the profiled foam part 7 differ in density and therefore have different properties.

A foamable material having an arbitrary consistency is filled into the hollow section and is expanded by providing energy to the foamable material. The foamable material is preferably introduced into the hollow section in powder or granular form, or as a paste material having a spreadable consistency. Energy is provided to the foamable material directly and/or indirectly as heat energy, high frequency energy, or microwave energy.

Figure 9:
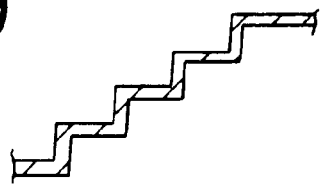
FIG. 9 is an enlarged, fragmentary, sectional view of a profiling in the form of steps.
Figure 10:
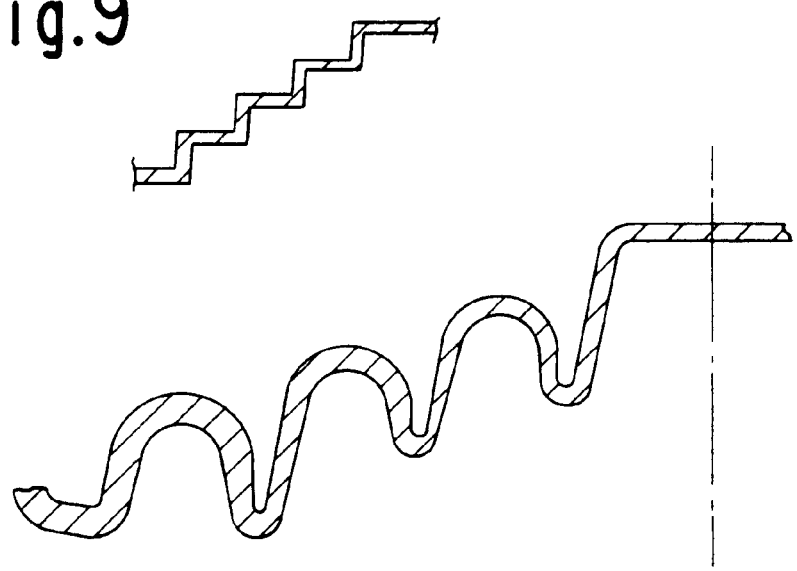
FIG. 10 is an enlarged, fragmentary, sectional view of a rounded profiling in the form of steps.
Figure 11:
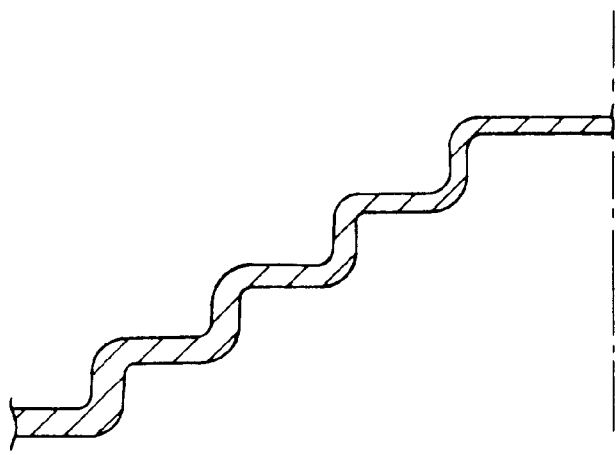
FIG. 11 is a fragmentary, sectional view similar to FIG. 9, but with external rounding of the steps.

FIG. 9 shows profilings in the form of steps, whereas in the case of the profiling illustrated in FIG. 10, tips of folds have a special thinned portion, so that predetermined breaking points are thereby provided. The reduction in wall cross section can be seen in particular in FIG. 11.

The structure according to the invention, in particular when the cavity is filled by foam, ensures that energy is adequately absorbed. In the event of an impact, the hollow section 1 is basically not subject to any deformation.

I claim:

1. A covering part for absorbing impact energy, comprising:
   a hollow section formed by blow molding, said hollow section defining a cavity and having thinned portions defining predetermined braking points; and
   a foam material filled in said cavity, said foam material placed in said cavity as a foamable material in one of a powder form, a granular form, and a paste form, and foamed by a thermal action.

2. The covering part according to claim 1, wherein said thermal action is a direct thermal action.

3. The covering part according to claim 1, wherein said thermal action is an indirect thermal action performed by one of a microwave energy and a high frequency energy.

4. In a motor vehicle having a sheet-metal supporting part, a covering part, comprising:
   a hollow section formed by blow molding, said hollow section defining a cavity and having thinned portions defining predetermined breaking points; and
   a foam material filled in said cavity, said foam material placed in said cavity as a foamable material in one of a powder form, granular form, and paste form, and foamed by a thermal action.

* * * * *